(12) United States Patent
Hertel (10) Patent No.: US 11,565,685 B2
(45) Date of Patent: Jan. 31, 2023

(54) WORK VEHICLE DIRECT DRIVE POWER SYSTEM WITH TORQUE CONTROL MODE

(71) Applicant: Deere & Company, Moline, IL (US)

(72) Inventor: Benjamin J. Hertel, S. Coffeyville, OK (US)

(73) Assignee: DEERE & COMPANY, Moline, IL (US)

( * ) Notice: Subject to any disclaimer, the term of this patent is extended or adjusted under 35 U.S.C. 154(b) by 623 days.

(21) Appl. No.: 16/591,896

(22) Filed: Oct. 3, 2019

(65) Prior Publication Data

US 2021/0101580 A1 Apr. 8, 2021

(51) Int. Cl.
| | |
|---|---|
| *B60W 10/11* | (2012.01) |
| *B60W 10/18* | (2012.01) |
| *B60W 10/103* | (2012.01) |
| *F16H 63/30* | (2006.01) |
| *F16H 63/50* | (2006.01) |

(Continued)

(52) U.S. Cl.
CPC .......... *B60W 10/103* (2013.01); *B60W 10/11* (2013.01); *B60W 10/18* (2013.01); *F16H 63/3023* (2013.01); *F16H 63/50* (2013.01); *B60W 2510/0638* (2013.01); *F16H 2059/6807* (2013.01); *F16H 2061/2823* (2013.01); *F16H 2061/302* (2013.01); *F16H 2306/54* (2013.01)

(58) Field of Classification Search
CPC .................. B60W 10/11; B60W 10/18; B60W 2510/0638; F16H 2059/6807; F16H 2061/2823; F16H 2061/302; F16H 63/3023; F16H 63/50; F16H 2306/54
See application file for complete search history.

(56) References Cited

U.S. PATENT DOCUMENTS 6,432,015 B1 * 8/2002 Takahashi ............... F16H 61/12
475/116
9,982,774 B1 * 5/2018 Jin ....................... F16H 57/0446
(Continued)

FOREIGN PATENT DOCUMENTS

| DE | 102012218227 A1 | 5/2013 |
|---|---|---|
| DE | 102013203513 A1 | 9/2013 |

OTHER PUBLICATIONS

German Search Report issued in counterpart application No. 102020210754.8 dated Apr. 20, 2021 (12 pages).

*Primary Examiner* — Edwin A Young
(74) *Attorney, Agent, or Firm* — Klintworth & Rozenblat IP LLP (57) ABSTRACT

A power system includes an engine; a sensor to determine an engine speed; and a transmission. The transmission includes an input element configured to receive the power from the engine as input torque; an output element configured to provide at least a portion the power from the engine as output torque; and a clutch arrangement to transform the input torque into output torque. The clutch arrangement includes at least one clutch selectively positionable between a fully engaged state, a partially engaged state in which a portion of the input torque is transformed into the output torque, and a fully disengaged state. A controller is coupled to the at least one clutch and configured to generate clutch commands based at least in part on the engine speed to position the at least one clutch into the fully engaged state, the partially engaged state, or the fully disengaged state.

17 Claims, 5 Drawing Sheets

(51) Int. Cl.
  *F16H 59/68* (2006.01)
  *F16H 61/28* (2006.01)
  *F16H 61/30* (2006.01)

(56) References Cited

U.S. PATENT DOCUMENTS

2015/0362026 A1 12/2015 Kawamoto
2017/0183011 A1* 6/2017 Theel .................... B60W 10/02

* cited by examiner

WORK VEHICLE DIRECT DRIVE POWER SYSTEM WITH TORQUE CONTROL MODE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and more specifically to regulating output torque in a work vehicle.

BACKGROUND OF THE DISCLOSURE

Heavy work vehicles, such as used in the construction, agriculture, and forestry industries, typically include a power system with an internal combustion engine in the form of a compression ignition engine (i.e., diesel engine) or a spark ignition engine (i.e., gasoline engine). Many of the work vehicles, such as a motor grader, have a direct drive transmission (or direct drive modes) in which the output of the engine is directly coupled to the wheels of the work vehicle. In such arrangements, it may be desirable to improve regulation of the torque through the drive train.

SUMMARY OF THE DISCLOSURE

The disclosure provides a power system that regulating output torque of a work vehicle.

In one aspect, the disclosure provides a power system for providing power to a driven component of a work vehicle. The power system includes an engine configured to generate power; a sensor configured to determine an engine speed associated with the engine; and a transmission. The transmission includes an input element configured to receive the power from the engine as input torque; an output element configured to provide at least a portion the power from the engine as output torque to the driven component; and a clutch arrangement coupled to the input element and the output element to transform the input torque into output torque. The clutch arrangement includes at least one clutch selectively positionable between a fully engaged state in which approximately all of the input torque is transformed into the output torque, a partially engaged state in which a portion of the input torque is transformed into the output torque as a resultant torque fraction, and a fully disengaged state in which no input torque is transformed into the output torque. The power system includes a controller coupled to receive data of the engine speed from the sensor. The controller is further coupled to the at least one clutch and configured to generate clutch commands based at least in part on the engine speed to position the at least one clutch into the fully engaged state, the partially engaged state, or the fully disengaged state.

In another aspect, the disclosure provides a transmission controller for a transmission of a work vehicle with a clutch arrangement to transform input torque from an engine into output torque to drive a drive train. The transmission controller includes a processor and memory storing one or more computer programs executable by the processor to perform transmission control operations. The transmission control operations include receiving a default mode selection for implementing a default mode or a torque control mode selection for implementing a torque control mode; receiving data of an engine speed of the engine; and generating, upon implementation of the in the torque control mode, clutch commands based on the engine speed for the clutch arrangement to place at least one clutch of the clutch arrangement into a fully engaged state in which approximately all of the input torque is transformed into the output torque, a partially engaged state in which a portion of the input torque is transformed into the output torque as a resultant torque fraction, or a fully disengaged state in which no input torque is transformed into the output torque.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system and method for regulating output torque in a work vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Generally, work vehicles may include power systems with engines to produce torque in a wide range of applications, such as motor graders, long-haul trucks, tractors, agricultural or construction vehicles, surface mining equipment, non-electric locomotives, stationary power generators and the like. In some work vehicles, the engine is directly mechanically coupled with a direct drive transmission to a vehicle driven component, such as the propulsion or drive wheels.

As used herein, "direct mechanical" power transmission or "direct drive" transmission may include transmission of mechanical power by direct physical connection, through various integrally formed parts, or via various intervening mechanical elements such as a gear set to modify rotational speeds. In contrast, for example, power transmission using a torque converter or other fluid coupling may not be considered a "direct mechanical" transmission. As used herein, "between" may refer to a location with respect to a flow of power, rather than an actual physical location. As such, for example, a clutch device may be viewed as located "between" an engine and an output element power-conversion device if power is routed from the engine through the clutch device in order to reach the output element.

In some embodiments, a vehicle or transmission controller selectively operates in a torque control mode in which clutch commands are generated to transform input torque into output torque as a function of engine speeds. In particular, at relatively low engine speeds, the controller generates clutch commands to place the clutches of the transmission clutch arrangement into partially engaged states to generate resultant torque fractions of output torque that are less than the input torque. The manner in which the controller increases and decreases the resultant torque fractions in view of the engine speeds may vary based on gear selection, as well as braking characteristics. In effect, the torque control mode enables enhanced control of the transmission such that the engine may operate at relatively high speeds that avoid stall, even while enabling the relatively slower output and reduced output torque at the wheels than would otherwise be possible with the gear ratios of the transmission.

The following describes one or more example implementations of the disclosed systems and methods for improving operation of power systems, particularly with respect to operating a direct drive transmission. Discussion herein may sometimes focus on the example application of transmission arrangement in a motor grader, but the disclosed systems and methods are applicable to other types of work vehicles and/or other types of engine and transmission systems.

Figure 1:
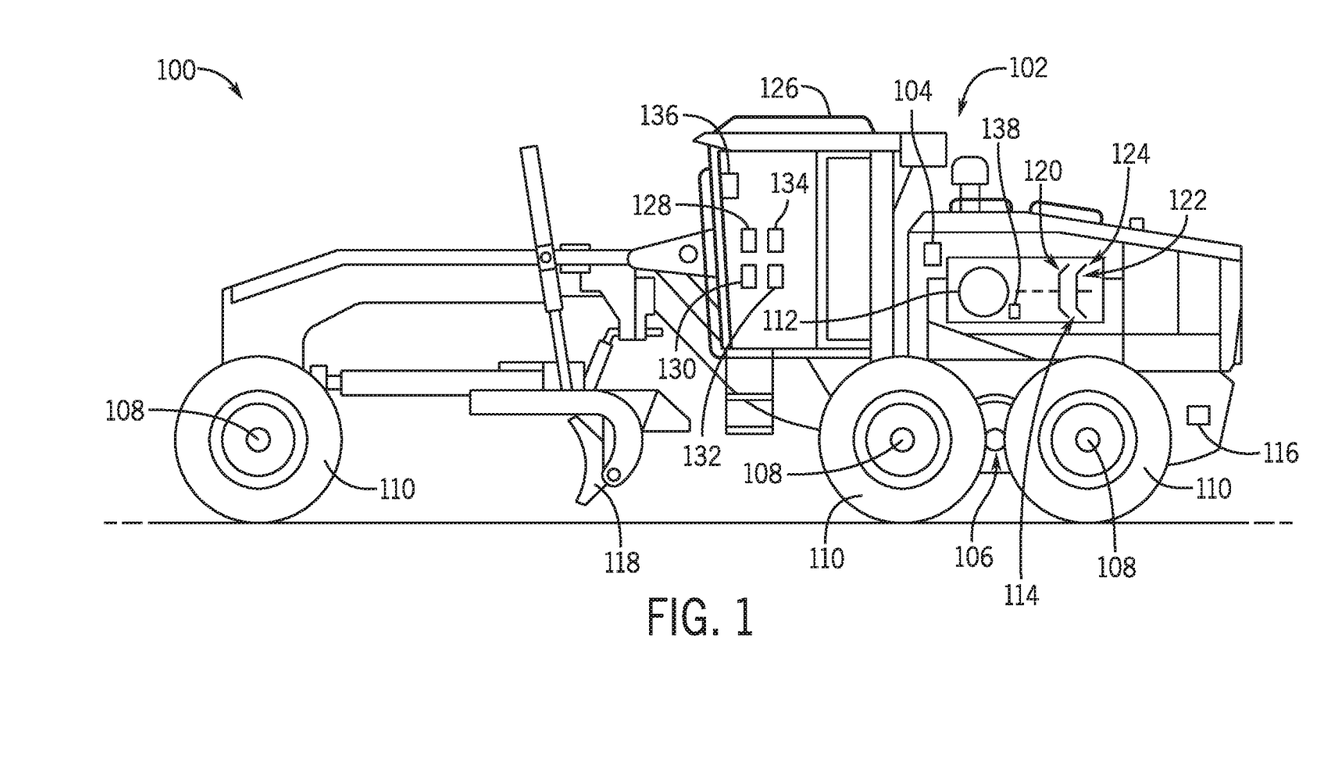
FIG. 1 is a side view of an example work vehicle in the form of a motor grader in which a power system may be implemented in accordance with this disclosure.

Referring to FIG. 1, in some embodiments, the disclosed systems and methods may be used with a work vehicle 100 having a power system 102 that enables selective operation in a torque control mode in which torque may be additionally moderated within the power system 102. Generally, various functions of the power system 102 and/or the work vehicle 100, including the torque control mode, may be implemented with a controller 104, which will be discussed below in greater detail after a brief introduction of the work vehicle 100. Although not shown or described in detail herein, the work vehicle 100 may include any number of additional or alternative systems, subsystems, and elements.

In this example, the work vehicle 100 is a road or motor grader ("grader") with a chassis 106 supporting the power system 102 that generates power to propel or move the work vehicle 100, as well as providing power for various work functions of the work vehicle 100. The power system 102 includes a number of axles 108, each supporting one or more wheels 110, and a prime mover (e.g., an "engine") 112 that generates the power, typically in the form of output torque via a transmission 114, to drive one or more of the axles 108 and wheels 110. The work vehicle 100 may have any number of axles 108 and associated drive wheels 110, including the first, second, and third axles 108 and corresponding wheels 110. The power system 102 may drive some or all of the wheels 110 (e.g., only the rear wheels, both the front and rear wheels, and the like) based on the configuration of the transmission 114 and associated drive components. Although the depicted embodiment includes wheels 110, any suitable output element or mechanism for engaging a support surface (e.g. the ground) may be provided, including tires, continuous tracks, or other traction devices. In some examples, the engine 112, transmission 114, and wheels 110 may be considered part of a drive train. Additionally, a brake 116 may be provided to stop or slow rotation of the wheels 110 and overall movement of the vehicle 100.

The work vehicle 100 further includes an implement 118 for performing one or more work functions. In this example, the implement 118 is a ground engaging tool with a blade located between the second and third axles 108 that scrapes and flattens the support surface during a grading operation. The implement 118 may include alternative or additional implements such as a ripper, a scarifier, a front attachment, a plough, a sweeper, a shovel, and the like, and further may be located in various positions. The implement 118 may be driven by power from the power system 102 for various types of actuation based on commands from the controller 104 or other suitable mechanism.

Returning to the power system 102, the engine 112 is any power source to provide rotational driveline power, which includes an input power to the transmission 114 to subsequently transfer the power to the wheels 110 as output torque. For example, the engine 112 may include, but is not limited to, an internal combustion engine, a piston engine, a rotary engine, a hydraulic motor, a hydrostatic system, an electric motor, etc. The term "engine" used herein is not limited to any particular type of prime mover.

Broadly, the transmission 114 may be embodied as a single-speed or multi-speed transmission, or infinitely-variable transmission through direct coupling means, torque converter drives, hydrostatic drives, electric motor drives, or any other transmission known now or in the future to those having ordinary skill in the art. As one example, a direct drive multi-speed transmission may be provided in which the transmission 114 is coupled to the wheels 110 by direct physical connection, through various integrally formed parts, or via various intervening mechanical elements such as a gear set to modify rotational speeds. Generally, the embodiments of the power system 102 discussed herein may be applied to any power transmission system containing a friction element or any other transmission system capable of varying levels of torque application.

In this example and as discussed in greater detail below, the transmission 114 may include an input side element 120 and an output side element 122 coupled through a clutch arrangement 124 with various elements capable of transmitting torque. The input side element 120 receives the power from the engine 112 as input torque, and the clutch arrangement 124 transforms the input torque into an output torque on the output side element 122. For example, the output torque from the output side 122 is geared directly to and drives one or more of the wheels 110.

Generally, the clutch arrangement 124 includes one or more clutches, each with cooperating elements configured to frictionally engage one another to transmit at least a portion of the torque through the respective clutch and to disengage from one another to cut off the transmission of torque through the respective clutch. In one example, each clutch of the clutch arrangement 124 may be associated with a pressure or proportional control valve that receives or releases pressure to reposition the respective clutch elements based on commands from the controller 104. For example, the controller 104 generates clutch commands in the form of a controlled current to the control valve such that the clutch pressure is adjusted in proportion to the current. It should be understood that the clutch engagement may be controlled in other suitable ways.

As such, the controller 104 may command the clutches into varying levels of engagement to represent selected clutch states. In one example, the clutch states may include a fully engaged state in which the two clutch elements are completely engaged to transmit effectively or approximately all of the torque through the respective clutch; a fully disengaged state in which the two clutch elements are completely disengaged to transmit none of the torque through the respective clutch; and a partially engaged state in which the two clutch elements are partially engaged to transmit a portion of the torque through the clutch. The partially engaged state corresponds to a range of engagements or clutch pressures between less than fully engaged and more than disengaged. The fully engaged state and the partially engaged state may be considered "actuated" states. As used herein, in reference to the fully engaged state, the term "effectively or approximately all of the torque" refers to the output torque being equal to the input torque, subject to normal efficiency loses through the transmission, e.g., such that the output torque is above 90% or 95% of the input torque. As described in greater detail below, the controller 104 may command selected amounts of pressure to a single clutch or a combination of clutches to transmit a desired amount of torque between the input side element 120 and the output side element 122, and thus, between the engine 112 and the axles 108 or wheels 110, thereby enabling a regulation of the amount of output torque. Additional information regarding the operation of the clutch arrangement 124 is provided in greater detail below.

The vehicle 100 may additionally include a cab 126 that houses an operator, as well as various components to facilitate operation of the vehicle 100 by the operator, including a throttle 128, a gear selection element 130, a brake input element 132, a mode selection element 134, and a display device 136. Generally, the throttle 128 may receive an input from the operator representing a speed or power request. Subject to gear changes, an increase in throttle position typically increases the speed of the engine 112, and a decrease in throttle position typically decreases the speed of the engine 112. The gear selection element 130 receives an input from the operator representing a gear or speed ratio selection (a "gear selection") for the transmission 114. In some examples, the gear selection element 130 may be omitted and/or the gear selection may be automated by the controller 104. The brake input element 132 receives an input from the operator representing a request to slow or stop the wheels 110 of the vehicle 100 with the brake 116.

The mode selection element 134 may receive operator input representing a selected mode associated with the power system 102. In one example, operation of the power system 102 may be considered to include a first or default mode and a torque control mode, although other modes may be provided. Generally, and as discussed in greater detail below, in the default mode, the controller 104 selectively commands the clutches of the clutch arrangement 124 of the transmission 114 into engaged states and disengaged states; and in the torque control mode, the controller 104 selectively commands the clutches of the clutch arrangement 124 of the transmission 114 into engaged states, disengaged states, and partially engaged states, thereby enabling additional control of the torque through the transmission 114.

Generally, the throttle 128, gear selection element 130, brake input element 132, and mode selection element 134 may take any suitable form, including levers, buttons, knobs, graphical user interface elements incorporated into the display device, switches, pedals, joysticks, keyboards, audible devices, microphones associated with a speech recognition system, or various other human-machine interface devices. The display device 136 may also take any form, such as a monitor, that is operatively coupled to controller 104 for providing visual feedback to the operator. In one embodiment, display device 136 is provided as a simple flat screen display tablet in operator cab 126. In other embodiments, display device 136 is a heads-up style display where images are projected or otherwise displayed, for example, on the windows of operator cab 126. Generally, the display device 136 may display or otherwise communicate the selected power system mode and other information associated with the power system 102 to the operator, as discussed in greater detail below. In some examples, one or more of the throttle 128, the gear selection element 130, the brake input element 132, and/or the display device 136 may be omitted and/or associated functions automated.

The vehicle 100 may further include one or more sensors to collect information associated with the vehicle 100. In one example, the sensors may include an engine speed sensor 138 that measures engine speed, typically in the form of rotations per minute (RPM) at the engine output shaft (not shown) or the transmission input side element 120. Other sensors may be provided. For example, in some embodiments, a temperature sensor associated with the clutch arrangement 124 and/or transmission 114 may be provided.

As noted above, the controller 104 is provided to control various operational aspects of the work vehicle 100. Generally, the controller 104 may receive inputs from a number of sources, including the operator via the throttle 128, gear selection element 130, brake input element 132, and mode selection element 134, as well as from various sensors, units, and systems onboard or remote from the vehicle; and in response, the controller 104 generates one or more types of commands for implementation by the various systems of vehicle 100. As one example discussed in greater detail below, the controller 104 may facilitate operation of the power system 102, particularly with respect to implementing the default mode and the torque control mode to regulate torque through the transmission 114. Moreover, the controller 104 may generate display signals associated with this operation on the display device 136.

Broadly, the controller 104 may be configured as a computing device with associated processor devices and memory architectures, as a hard-wired computing circuit (or circuits), as a programmable circuit, as a hydraulic, electrical or electro-hydraulic controller, or otherwise. As such, the controller 104 may be configured to execute various computational and control functionality with respect to the work vehicle 100 (or other machinery). In some embodiments, the controller 104 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 104 (or a portion thereof) may be configured as an assembly of hydraulic components (e.g., valves, flow lines, pistons and cylinders, and so on), such that control of various devices (e.g., pumps or motors) may be implemented with, and based upon, hydraulic, mechanical, or other signals and movements.

As introduced above and discussed in greater detail below, the power system 102 may have default and torque control modes in which the controller 104 generates clutch commands for the clutch arrangement 124 to regulate output torque to the wheels 110. In the torque control mode, the commanded clutch pressures within the transmission 114 are such that only a fraction of the torque is transferred through the clutch arrangement 124 of the transmission 114, thereby resulting in reduced output torque at the output element being transferred to drive wheels 110. The operation of the power system 102, particularly during the torque control mode, will be discussed in greater detail with reference to FIG. 2.

Figure 2:
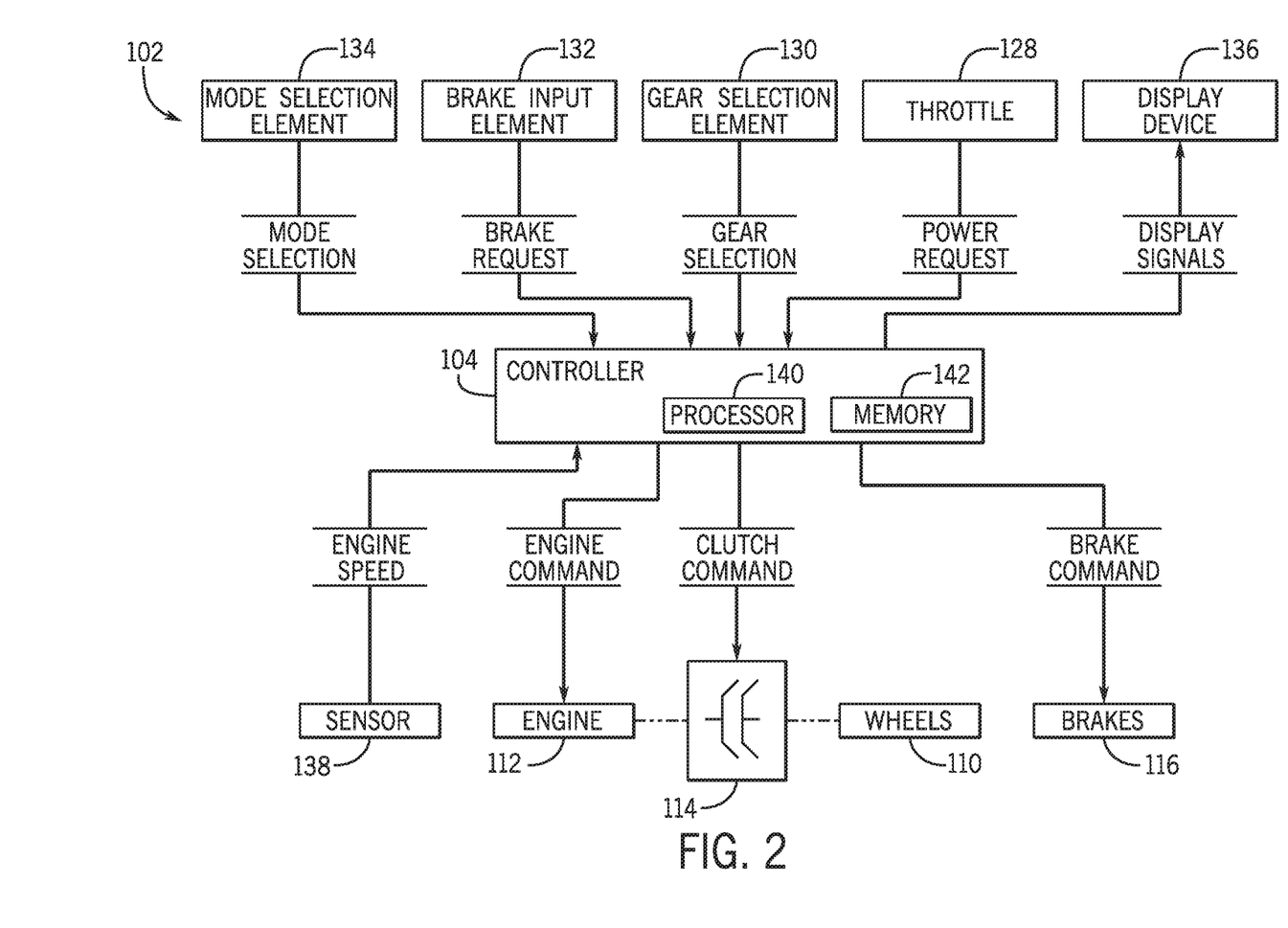
FIG. 2 is a schematic block diagram of the power system for the work vehicle of FIG. 1 in accordance with an example embodiment.

Referring to FIG. 2, there is shown a schematic representation of the power system 102 for providing power to the vehicle 100 of FIG. 1 with data flows indicating example operation. Generally, the controller 104 may be embodied as a processor 140 and memory 142 in which the processor 140 implements the various functions of the power system 102 described herein by executing programs or instructions stored in memory 142. Further, memory 142 may be considered to include a database or other type of data storage for storing system parameters and/or schedules for evaluating the data inputs and generating commands in response, as discussed in greater detail below. The controller 104 may be considered a vehicle controller or a dedicated transmission controller to implement operation of the transmission 114 during the various modes.

As shown, the controller 104 receives various inputs, including a mode selection from the mode selection element 134, a power request from the throttle 128, a gear selection from the gear selection element 130, and a brake request from the brake input element 132. The controller 104 further receives data associated with engine speed from the engine speed sensor 138.

Regardless of the mode, the controller 104 generates engine commands for the engine 112 based on the power requests and brake commands for the brakes 116 based on the brake requests. In response, the engine 112 implements the engine commands, and the brakes 116 implement the brake commands. Although not shown and/or discussed in greater detail, the controller 104 may also receive operating input associated with the implement 118 and generate associated implement commands to perform various work functions. Such commands may be based on look-up tables and/or instructions stored in memory 142.

Initially, in view of the mode selection, the controller 104 determines the current mode and modifies the mode if the mode selection differs from the current mode or maintains the mode if the mode selection matches the current mode. As noted above, the mode selection may correspond to the default mode or the torque control mode. The operation of the transmission 114 during the default mode and the torque control mode will now be described.

During the default mode, the controller 104 generates clutch commands for the clutch arrangement 124 corresponding to the gear selection. The controller 104 may generate the clutch commands (e.g., as particular currents for the clutch control valves) based on a default mode schedule stored as a look-up table in memory 142 or other suitable mechanism. As described in greater detail below with reference to the example clutch arrangement 124 depicted in FIG. 3, the clutch commands generated by the controller 104 function to actuate selected clutches and/or to maintain other selected clutches as unactuated (or disengaged) within the clutch arrangement 124 to implement particular gear ratios between engine 112 and wheels 110. Notably, in the default mode, the actuated clutches of the clutch arrangement are placed into fully engaged states such that effectively all of the torque from the engine 112 is transferred across the engaged clutches to the wheels 110.

Figure 3:
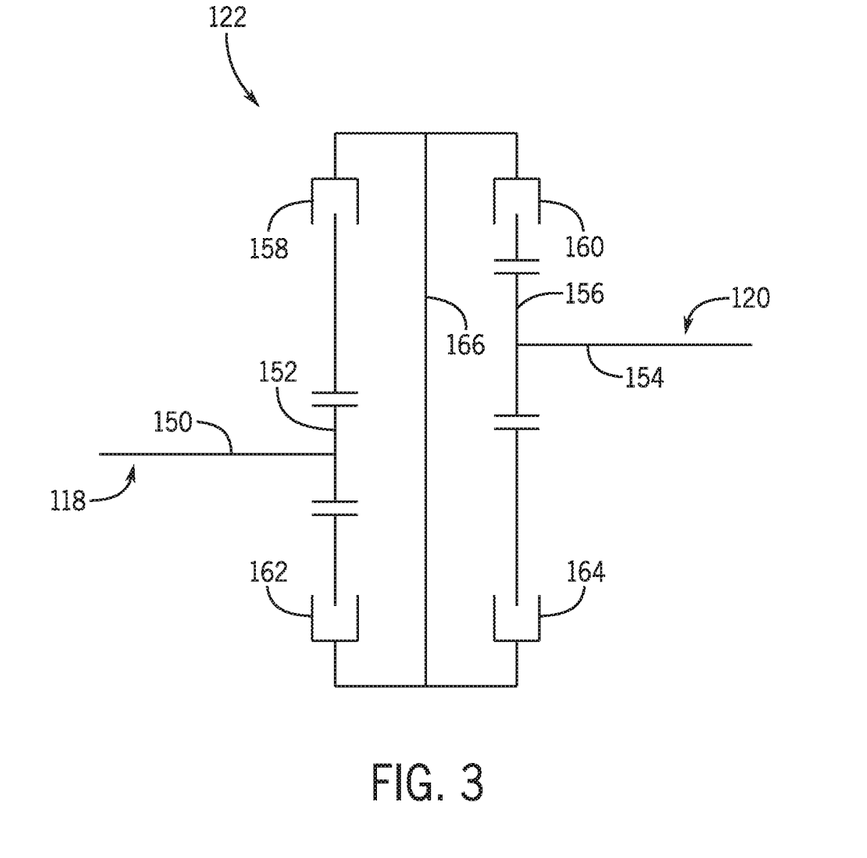
FIG. 3 is a schematic representation of an example transmission of the power system of FIG. 2 in accordance with an example embodiment.

Reference is briefly made to FIG. 3, which is a relatively simple example of a clutch arrangement 124 that may implement the default mode (and the torque control mode, discussed below) for the power system 102 described herein. In the example of FIG. 3, the clutch arrangement 124 is positioned between the input side element 120 in the form of an input shaft 150 with an input gear element 152 attached thereto and the output side element 122 in the form of an output shaft 154 with an output gear element 156 attached thereto. The depicted clutch arrangement 124 further includes a first clutch 158, a second clutch 160, a third clutch 162, and a fourth clutch 164 that are coupled together via a coupling shaft 166. The first and third clutches 158, 162 are selectively engaged with the input gear element 152, and the second and fourth clutches 160, 164 are selectively engaged with the output gear element 156. As such, in this example, the engine 112 is connected by mechanical power-transfer connections (e.g., a rotating shaft, various gears, clutches, and so on), but not by a torque converter or power-conversion device, although other examples may have different configurations. In this way, when combinations of the clutches 158, 160, 162, 164 are engaged, as described below, a direct mechanical connection may be established between engine 112 and the wheels 110. It will be understood, for this and other examples, that various other transmission types or configurations may additionally (or alternatively) be employed.

As noted above, the controller 104 generates the clutch commands to actuate one or more of the clutches 158, 160, 162, 164 to implement various gear ratios (or "gears") between the input shaft 150 and the output shaft 154. For example in the default mode, in a first gear, the first and second clutches 158, 160 are placed in fully engaged states and the third and fourth clutches 162, 164 are in fully disengaged states; in a second gear, the second and third clutches 160, 162 are placed in fully engaged states and the first and fourth clutches 158, 164 are in fully disengaged states; in a third gear, the first and fourth clutches 158, 164 are placed in fully engaged states and the second and third clutches 160, 162 are in fully disengaged states; and in a fourth gear, the third and fourth clutches 162, 164 are placed in fully engaged states and the first and second clutches 158, 160 are in fully disengaged states. In this manner, the controller 104 may modify the gear ratios from the engine 112 to the wheels 110 according to the gear selection from the input side element 120. As noted above, in this default mode, the actuated clutches 158, 160, 162, 164 are fully engaged and no clutch is commanded into the partially engaged state.

Referring again to FIG. 2, upon receiving a mode selection representing the torque control mode, the controller 104 initiates operation of the power system 102 in the torque control mode. Generally, the controller 104 generates the clutch commands based on a torque control mode schedule that may be stored as a look-up table in memory 142. As in the default mode, the controller 104 generates clutch commands for the clutch arrangement 124 corresponding to the gear selection from the input side element 120. Further, the controller 104 during the torque control mode additionally generates the clutch commands as a function of the engine speed and may place selected clutches in partially engaged states, fully engaged states, or fully disengaged states. In particular, and in contrast to the default mode, the controller 104 in the torque control mode further utilizes partially engaged states of the clutches to modify output torque through the clutch arrangement 124. In effect, the extent of actuation of the actuated clutches during the torque control mode is based on the engine speed such that at certain speeds, the actuated clutches are commanded into the particular partially engaged states and at other speeds, the actuated clutches are commanded into the fully engaged states. In this manner, each clutch in a partially engaged state experiences individual slip to, in effect, reduce the potential efficiency of the clutch relative to the fully engaged state such that only a portion of the torque is transferred through the transmission.

Referring again to FIG. 3, the actuation or non-actuation of the clutches 158, 160, 162, 164 of clutch arrangement 124 in the torque control mode generally corresponds to the that of the default mode, except that each the actuated clutches 158, 160, 162, 164 may be actuated into the fully engaged state or the partially engaged state. In particular for the torque control mode, in the first gear, the first and second clutches 158, 160 are actuated into fully or partially engaged states and the third and fourth clutches 162, 164 are in fully disengaged states; in the second gear, the second and third clutches 160, 162 are actuated into fully or partially engaged states and the first and fourth clutches 158, 164 are in fully disengaged states; in the third gear, the first and fourth clutches 158, 164 are actuated into fully or partially engaged states and the second and third clutches 160, 162 are in fully disengaged states; and in the fourth gear, the third and fourth clutches 162, 164 are actuated into fully or partially engaged states and the first and second clutches 158, 160 are in fully disengaged states. In summary, in the torque control mode, the clutches 158, 160, 162, 164 that are not disengaged may be actuated into partially or fully engaged states to control torque through the transmission 114.

The extent of actuation of each clutch 158, 160, 162, 164 within a partially engaged state or into the fully engaged state may be based on engine speed according to predetermined torque control mode schedules of clutch currents that correspond to clutch pressures (e.g., "effective clutch pressures") to result in predetermined torque fractions relative to the torque of fully engaged actuated clutches 158, 160, 162, 164 of the clutch arrangement 124 (e.g., a "resultant torque fraction"). Generally, the term resultant torque fraction may refer to the portion of torque transformed through the combination of actuated clutches 158, 160, 162, 164 of the clutch arrangement 124. In some examples, only one of the actuated clutches 158, 160, 162, 164 may be partially engaged to result in a resultant torque fraction of less than 100%. In other words, only a single partially engaged clutch 158, 160, 162, 164 may implement the modified torque output such that the amount of torque not transferred across the partially engaged clutch 158, 160, 162, 164 also corresponds to the amount of torque not transferred through the clutch arrangement 124. In other examples, combinations of clutches 158, 160, 162, 164 may be partially engaged to result in the resultant torque fraction of less than 100%. In other words, two or more partially engaged clutches 158, 160, 162, 164 may, in combination, result in the resultant torque fraction of less than 100%. As such, in the discussion below, the "effective clutch pressure" that generates the resultant torque fraction may be implemented in a single clutch 158, 160, 162, 164 or a combination of actuated clutches 158, 160, 162, 164. In any event, the resultant torque fraction may be a function of engine speed, as well as other parameters, such as the selected gear.

Figure 4:
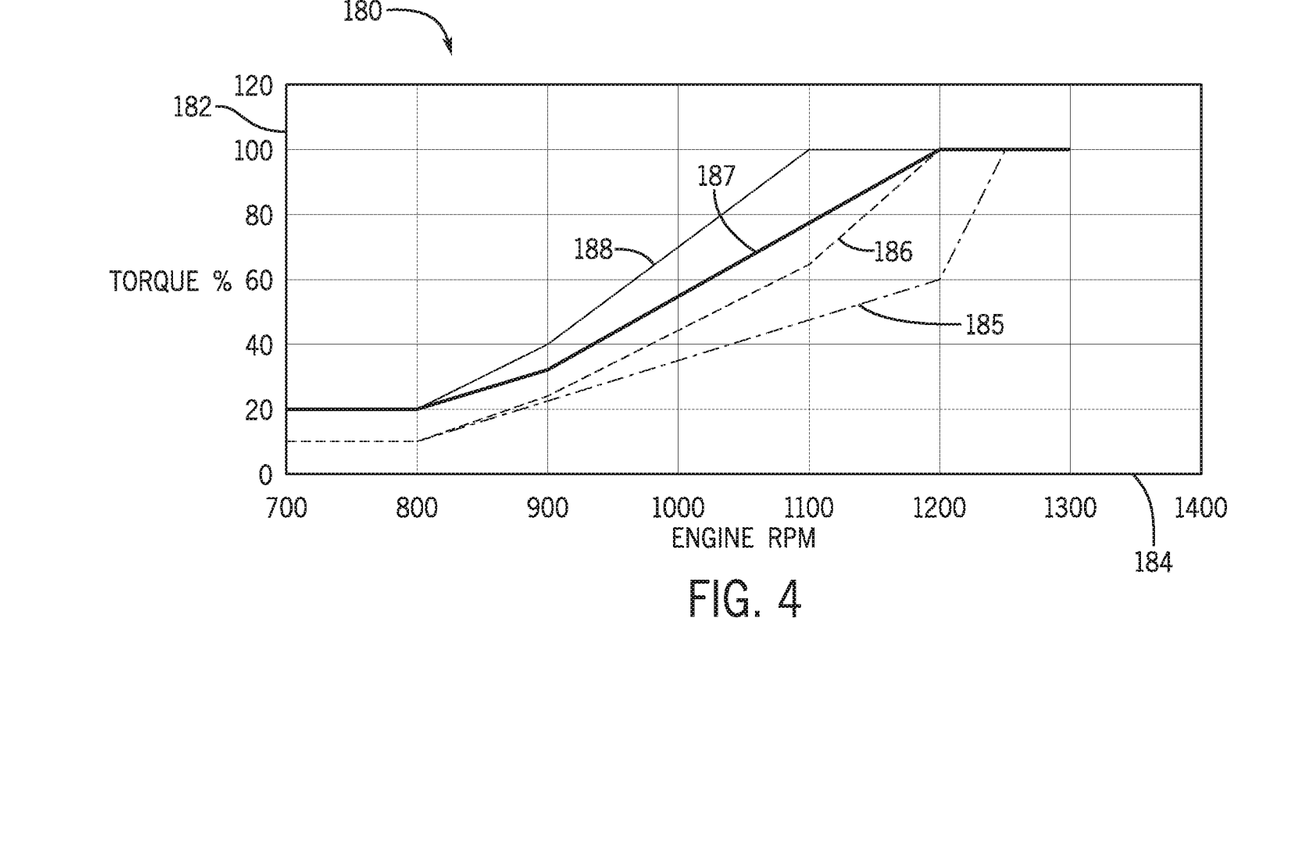
FIG. 4 is a graphical representation of resultant torque fractions as a function of engine speed in a torque control mode of the power system of FIG. 2 in accordance with an implementation of an example embodiment.

One example torque control mode schedule 180 is represented in FIG. 4 that depicts resultant torque fractions from the corresponding effective clutch pressures on a vertical axis 182 in view of engine speeds on a horizontal axis 184. In particular, torque control mode schedule 180 may have a stored look-up table of clutch commands as a function of engine speeds (and optionally gear selections) in the form of currents to implement the effective clutch pressures that generate the resultant torque fractions depicted in FIG. 4. For example, a resultant torque fraction of 50% indicates that one or more clutches of the actuated clutches within a clutch arrangement 124 for a particular gear selection is actuated into a partially engaged state (or states) such that the output torque of the clutch arrangement 124 is approximately 50% of the input torque.

The nature of the relationship between engine speed and resultant torque fraction may vary based on the selected gear. For example, the torque control mode schedule 180 of FIG. 4 includes a first schedule portion 185 corresponding to the first gear, a second schedule portion 186 corresponding to the second gear, a third schedule portion 187 corresponding to the third gear, and a fourth schedule portion 188 corresponding to the fourth gear.

In the first gear and referring to the clutch arrangement 124 in the example of FIG. 3, the controller 104 generates clutch commands to actuate the first and second clutches 158, 160. As reflected by the first schedule portion 185, the controller 104 places the first and/or second clutches 158, 160 in partially engaged states such that the resultant torque fraction is approximately 10% through the transmission 114 at engine speeds of less than 800 rpm. Between 800 rpm and about 1200 rpm, the resultant torque fraction increases proportionally with engine speed at a first rate from approximately 10% to about 60%; and between about 1200 rpm and about 1250 rpm, the resultant torque fraction increases proportionally with engine speed at a second rate from approximately 60% to about 100%. As such, the resultant torque fraction is more sensitive (e.g., increases at a greater rate) to engine speed at engine speeds between 1200 rpm and 1250 rpm. Above 1250 rpm, the resultant torque fraction is 100%, indicating that the first and second clutches 158, 160 are in fully engaged states and all of the torque is transferred across the actuated clutches 158, 160 between the input shaft 150 and the output shaft 154.

In the second gear, the controller 104 generates clutch commands to actuate the second and third clutches 160, 162. As reflected by the second schedule portion 186, the controller 104 places the second and third clutches 160, 162 in partially engaged states such that the resultant torque fraction is approximately 10% through the transmission 114 at engine speeds of less than 800 rpm. Between about 800 rpm and 900 rpm, the resultant torque fraction increases proportionally with engine speed at a first rate from approximately 10% to about 25%; between about 900 rpm and 1100 rpm, the resultant torque fraction increases proportionally with engine speed at a second rate from approximately 25% to about 65%; and between about 1100 rpm and 1200 rpm, the resultant torque fraction increases proportionally with engine speed at a third rate from approximately 65% to about 100%. As such, the resultant torque fraction in the second gear is generally more sensitive (e.g., increases at a greater rate) to engine speed as compared the first gear. Above 1200 rpm, the resultant torque fraction is 100%, indicating that the second and third clutches 160, 162 are in fully engaged states and all of the torque is transferred across the actuated clutches 160, 162 between the input shaft 150 and the output shaft 154.

In the third gear, the controller 104 generates clutch commands to actuate the first and fourth clutches 158, 164. As reflected by the third schedule portion 187, the controller 104 places the first and fourth clutches 158, 164 in partially engaged states such that the resultant torque fraction is approximately 20% through the transmission 114 at engine speeds of less than 800 rpm. Between about 800 rpm and 900 rpm, the resultant torque fraction increases proportionally with engine speed at a first rate from approximately 20% to about 30%; and between about 900 rpm and 1200 rpm, the resultant torque fraction increases proportionally with engine speed at a second rate from approximately 30% to about 100%. As such, the resultant torque fraction in the third gear is generally more sensitive (e.g., increases at a greater rate) to engine speed as compared the first and second gears. Above 1200 rpm, the resultant torque fraction is 100%, indicating that the first and fourth clutches 158, 164 are in fully engaged states and all of the torque is transferred across the actuated clutches 158, 164 between the input shaft 150 and the output shaft 154.

In the fourth gear, the controller 104 generates clutch commands to actuate the third and fourth clutches 162, 164. As reflected by the fourth schedule portion 188, the controller 104 places the third and fourth clutches 162, 164 in partially engaged states such that the resultant torque fraction is approximately 20% through the transmission 114 at engine speeds of less than 800 rpm. Between about 800 rpm and 900 rpm, the resultant torque fraction increases proportionally with engine speed at a first rate from approximately 20% to about 40%; and between about 900 rpm and 1100 rpm, the resultant torque fraction increases proportionally with engine speed at a second rate from approximately 40% to about 100%. As such, the resultant torque fraction in the fourth gear is generally more sensitive (e.g., increases at a greater rate) to engine speed as compared the first, second, and third gears. Above 1100 rpm, the resultant torque fraction is 100%, indicating that the third and fourth clutches 162, 164 are in fully engaged states and all of the torque is transferred across the actuated clutches 162, 164 between the input shaft 150 and the output shaft 154.

In one embodiment, and additionally referring to FIG. 2, the controller 104 may generate display signals for the display device 136 that depicts information regarding operation of the power system 102, including the current power system mode, the resultant torque fraction, the current gear, and/or the current engine speed. Other parameters and characteristics may be depicted.

Figure 5:
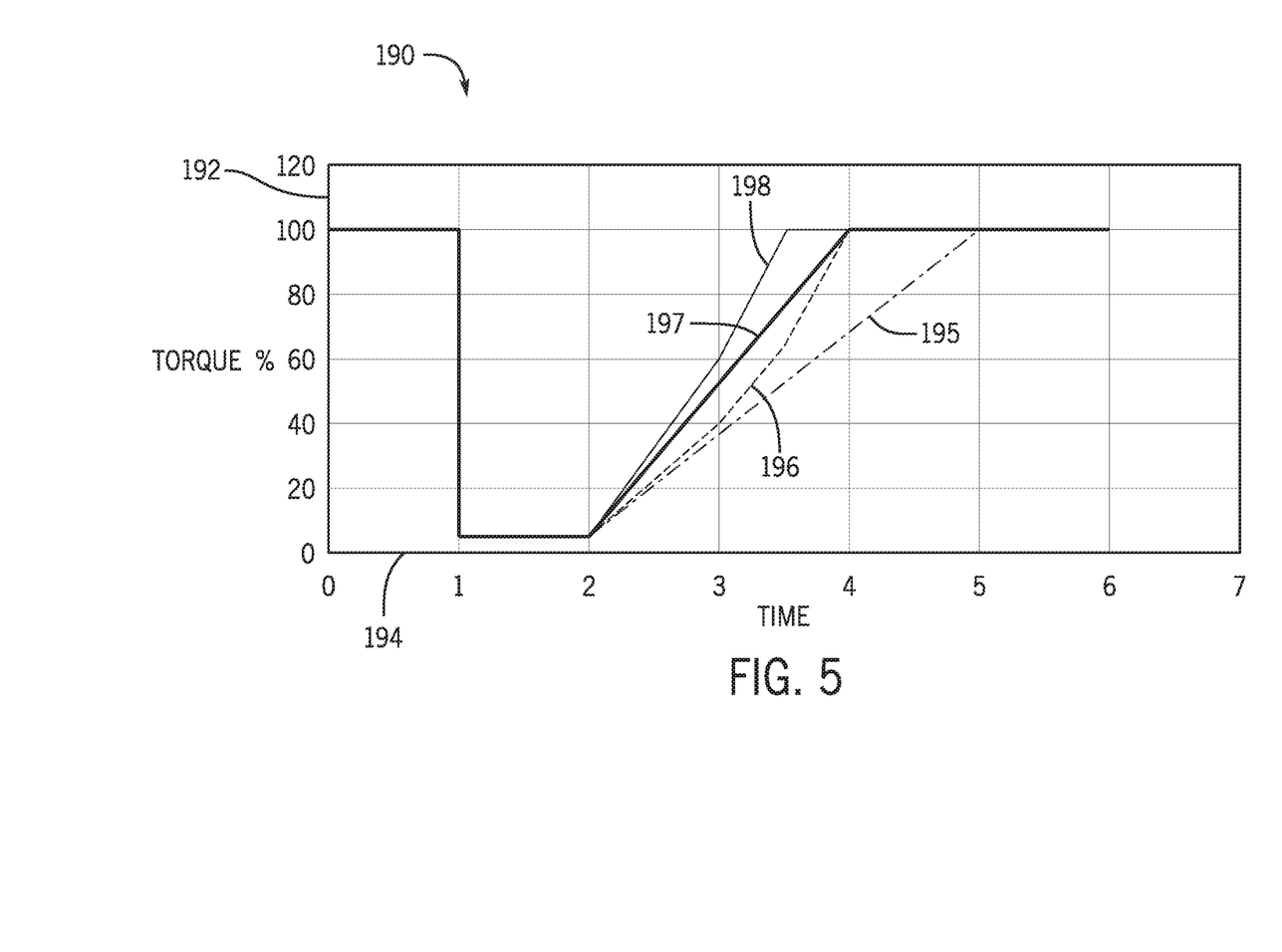
FIG. 5 is a graphical representation of resultant torque fractions as a function of time during a braking event in the torque control mode of the power system of FIG. 2 in accordance with a further implementation of an example embodiment.

In some embodiments, the controller 104 may additionally implement the torque control mode with consideration for a "braking event" (e.g., the receipt of a braking request from the brake input element 132 and the generation of a braking command for the brakes 116). A further example of a torque control mode schedule 190 is represented in FIG. 5 that depicts resultant torque fractions from the corresponding effective clutch pressures on a vertical axis 192 in view of time on a horizontal axis 194 during a braking event. In particular, torque control mode schedule 190 may have a stored look-up table of clutch commands in the form of currents to implement the effective clutch pressures that generate the resultant torque fractions depicted in FIG. 5. The nature of the relationships between resultant torque fractions and time during and after a braking event may vary based on the selected gear. For example, the torque control mode schedule 190 of FIG. 5 includes a first schedule portion 195 corresponding to the first gear, a second schedule portion 196 corresponding to the second gear, a third schedule portion 197 corresponding to the third gear, and a fourth schedule portion 198 corresponding to the fourth gear. In the example of FIG. 5, a braking event (e.g., a braking request from the brake input element 132) is reflected at time of 1 second.

Without the braking event, the torque control mode schedule 190 may approximate any suitable torque control mode schedule, such as the torque control mode schedule 180 of FIG. 4. The torque control mode schedule 190 of FIG. 5 reflects the impact of a braking event on the resultant torque fractions. Upon a braking event, the controller 104 commands clutch pressures that provide a resultant torque fraction of approximately 5% in all of the gears. The collective value of the resultant torque fraction that results from the braking event may be considered a minimum resultant torque fraction. At a time of 2 seconds, the controller 104 increases the resultant torque fraction at one or more ramp rates based on the selected gear to meet (or "return") the resultant torque fraction of a torque control mode schedule (e.g., schedule 180) without the braking event based on engine speed. As reflected by the first schedule portion 195, the controller 104 increases the resultant torque fraction to approximately 100% by a time of 5 seconds in the first gear. As reflected by the second and third schedule portions 196, 197, the controller 104 increases the resultant torque fractions to approximately 100% by a time of 4 seconds in the second and third gears, albeit at different ramp rates. As reflected by the fourth schedule portion 198, the controller 104 increases the resultant torque fraction to approximately 100% by a time of 3.5 seconds in the fourth gear.

As noted above, although the schedule portions 185-188 of FIG. 5 depict a return to a resultant torque portion of 100%, in one example, the schedule portions 185-188 may return to the appropriate value of resultant torque portion in view of engine speed, such as reflected by the schedule 180 of FIG. 4. For example, considering the schedules 180, 190 of FIGS. 4 and 5, at engine speeds above 1200 rpm during a braking event, the schedule 190 of FIG. 5 will be implemented as depicted for all gears. However, at lower engine speeds during a braking event, the resultant torque fraction of FIG. 4 is further modified by the resultant torque fraction of FIG. 5. For example, at a time of 3 seconds after a braking event with an engine speed of 900 rpm in the fourth gear, the resultant torque fraction is approximately 24% (e.g., the resultant torque fraction of 60% after the braking event of schedule 190 as the controller 104 returns to the resultant torque fraction of 40% of schedule 180). As such, the controller 104 enables operation of the transmission 114 with the torque control mode during braking events to slow the vehicle 100 in view of braking commands without slowing the engine speed.

In one embodiment, and additionally referring to FIG. 2, the controller 104 may generate display signals for the display device 136 that depicts information regarding operation of the power system 102 during the braking event, including an indication representing the braking event, the current mode, the resultant torque fraction, the current gear, and/or the current engine speed. Other parameters and characteristics may be provided.

Although FIGS. 4 and 5 depict example torque control mode schedules 180, 190 and schedule portions 185-188, 195-198, the various characteristics may vary in any suitable manner. For example, the changes in the resultant torque fractions may be non-linear and/or consistent across different gears.

As noted above, one or more temperature sensors may be provided to collect temperature information associated with clutch arrangement 124 and/or transmission 114, particularly during the torque control mode in which the partially engaged clutches may generate heat. In some embodiments, this temperature information may be considered as part of a mechanism for protecting the clutch arrangement.

Accordingly, embodiments discussed herein provides a vehicle or transmission controller that selectively operates in a torque control mode in which clutch commands are generated to transform input torque into output torque as a function of engine speeds. In particular, at relatively low engine speeds, the controller generates clutch commands to place the clutches of the transmission clutch arrangement into partially engaged states to generate resultant torque fractions of output torque that are less than the input torque. The manner in which the controller increases and decreases the resultant torque fractions in view of the engine speeds may vary based on gear selection, as well as braking characteristics. In effect, the torque control mode enables enhanced control of the transmission such that the engine may operate at relatively high speeds that avoid stall, even while enabling the relatively slower output and reduced output torque at the wheels than would otherwise be possible with the gear ratios of the transmission.

Among other benefits, example embodiments may provide a direct drive transmission arrangement with a combination of control and efficiency, but without the need for a torque converter or other fluid coupling between the engine and various other components of the power train. The disclosed power train characteristics may be used advantageously in a variety of settings and with a variety of machinery.

As will be appreciated by one skilled in the art, certain aspects of the disclosed subject matter may be embodied as a method, system (e.g., a work vehicle control method implemented by a controller of the work vehicle as a series of steps), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The controller may be on-board, remote, or a combination thereof and further may be a considered a vehicle controller, an exhaust treatment system controller, and/or one or more dedicated controllers for one or more of the components discussed herein. Generally, the controller may include any suitable type of processor and memory containing instructions executable by the processor to carry out the various functions described herein. The controller may be configured as a hard-wired computing circuit (or circuits), a programmable circuit, a hydraulic controller, an electrical controller, an electro-hydraulic controller, or otherwise. As such, the controller may be configured to execute various computational and control functionality with respect to the exhaust treatment system. In some embodiments, the controller may be configured to receive input signals in various formats (e.g., as hydraulic signals, voltage signals, current signals, and so on) and to output command signals in various formats (e.g., as hydraulic signals, voltage signals, current signals, mechanical movements, and so on).

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, the following examples are provided, which are numbered for easier reference.

1. A power system for providing power to a driven component of a work vehicle, comprising: an engine configured to generate power; a sensor configured to determine an engine speed associated with the engine; a transmission comprising: an input element configured to receive the power from the engine as input torque; an output element configured to provide at least a portion the power from the engine as output torque to the driven component; and a clutch arrangement coupled to the input element and the output element to transform the input torque into output torque, the clutch arrangement including at least one clutch selectively positionable between a fully engaged state in which approximately all of the input torque is transformed into the output torque, a partially engaged state in which a portion of the input torque is transformed into the output torque as a resultant torque fraction, and a fully disengaged state in which no input torque is transformed into the output torque; and a controller coupled to receive data of the engine speed from the sensor, the controller further coupled to the at least one clutch and configured to generate clutch commands based at least in part on the engine speed to position the at least one clutch into the fully engaged state, the partially engaged state, or the fully disengaged state.

2. The power system of example 1, wherein the transmission is a direct drive transmission.

3. The power system of example 1, wherein the controller is configured to selectively operate in a default mode according to a default mode schedule and in a torque control mode according to a torque control mode schedule; wherein the at least one clutch comprises a plurality of clutches, including: a first at least one clutch configured to, upon actuation by the clutch commands, transform the input torque into the output torque at a first gear ratio as a first gear; and a second at least one clutch configured to, upon actuation by the clutch commands, transform the input torque into the output torque at a second gear ratio as a second gear; and wherein the controller, in the first gear of the torque control mode, is configured to generate the clutch commands according to a first schedule portion of the torque control mode schedule, and in the second gear of the torque control mode, is configured to generate the clutch commands according to a second schedule portion of the torque control mode schedule associated with the second gear, the first schedule portion being different than the second schedule portion.

4. The power system of example 3, wherein the controller, in the first gear of the default mode, is configured to generate the clutch commands to actuate the first at least one clutch into the fully engaged state; wherein the controller, in the second gear of the default mode, is configured to generate the clutch commands to actuate the second at least one clutch into the fully engaged state; wherein the controller, in the first gear of the torque control mode, is configured to generate the clutch commands to actuate the first at least one clutch between the partially engaged state and the fully engaged state based on the engine speed according to the first schedule portion of the torque control mode schedule; and wherein the controller, in the second gear of the torque control mode, is configured to generate the clutch commands to actuate the second at least one clutch between the partially engaged state and the fully engaged state based on the engine speed according to the second schedule portion of the torque control mode schedule.

5. The power system of example 4, wherein the controller, in the first gear of the torque control mode, is configured to generate the clutch commands to place the first at least one clutch into the partially engaged state when the engine speed is below a first predetermined engine speed and to place the first at least one clutch into the fully engaged state when the engine speed is greater than the first predetermined engine speed; and wherein the controller, in the second gear of the torque control mode, is configured to generate the clutch commands to place the second at least one clutch into the partially engaged state when the engine speed is below a second predetermined engine speed and to place the second at least one clutch into the fully engaged state when the engine speed is greater than the second predetermined engine speed.

6. The power system of example 5, wherein the controller, in the first gear of the torque control mode, is configured to generate the clutch commands to place the first at least one clutch into the partially engaged state when the engine speed is below the first predetermined engine speed to transform the input torque into the output torque at the resultant torque fraction that is less than the input torque; and wherein the controller, in the second gear of the torque control mode, is configured to generate the clutch commands to place the second at least one clutch into the partially engaged state when the engine speed is below a second predetermined engine speed to transform the input torque into the output torque at the resultant torque fraction that is less than the input torque.

7. The power system of example 6, wherein the first predetermined engine speed is different than the second predetermined engine speed.

8. The power system of example 6, wherein the first at least one clutch includes at least a first clutch and a second clutch; and wherein the controller, in the first gear of the torque control mode, is configured to generate the clutch commands to place one of the first clutch or the second clutch of the first at least one clutch into the partially engaged state when the engine speed is below the first predetermined engine speed to transform the input torque into the output torque at the resultant torque fraction that is less than the input torque.

9. The power system of example 6, wherein the first at least one clutch includes at least a first clutch and a second clutch; and wherein the controller, in the first gear of the torque control mode, is configured to generate the clutch commands to place both of the first clutch and the second clutch of the first at least one clutch into the partially engaged state when the engine speed is below the first predetermined engine speed to collectively transform the input torque into the output torque at the resultant torque fraction that is less than the input torque.

10. The power system of example 6, wherein the controller is coupled to receive a braking request and to generate a braking command for at least one brake of the work vehicle; and wherein the controller, upon receipt of the braking request in the first gear of the torque control mode, is configured to generate the clutch commands to place the first at least one clutch into the partially engaged state such that the resultant torque output fraction is a minimum resultant torque fraction.

11. The power system of example 10, wherein the controller, upon completion of the braking request, in the first gear of the torque control mode, is configured to generate the clutch commands to place the first at least one clutch into the partially engaged state such that the resultant torque fraction is ramped up to the resultant torque fraction according to the first schedule portion of the torque control mode schedule.

12. The power system of example 3, wherein the controller is configured to receive a mode selection from an operator mode selection element to implement the default mode or the torque control mode.

13. A transmission controller for a transmission of a work vehicle with a clutch arrangement to transform input torque from an engine into output torque to drive a drive train, the transmission controller comprising: a processor; and memory storing one or more computer programs executable by the processor to perform transmission control operations, including: receiving a default mode selection for implementing a default mode or a torque control mode selection for implementing a torque control mode; receiving data of an engine speed of the engine; and generating, upon implementation of the in the torque control mode, clutch commands based on the engine speed for the clutch arrangement to place at least one clutch of the clutch arrangement into a fully engaged state in which approximately all of the input torque is transformed into the output torque, a partially engaged state in which a portion of the input torque is transformed into the output torque as a resultant torque fraction, or a fully disengaged state in which no input torque is transformed into the output torque.

14. The transmission controller of example 13, wherein the transmission control operations further include selectively operating in a default mode according to a default mode schedule and in a torque control mode according to a torque control mode schedule such that, in a first gear of the torque control mode, the clutch commands are generated according to a first schedule portion of the torque control mode schedule, and in a second gear of the torque control mode, the clutch commands are generated according to a second schedule portion of the torque control mode schedule associated with the second gear, the first schedule portion being different than the second schedule portion.

15. The transmission controller of example 14, wherein the transmission control operations further include selectively operating; in the first gear of the default mode, such that the clutch commands are generated to actuate a first at least one clutch into the fully engaged state; in the second gear of the default mode, such that the clutch commands are generated to actuate a second at least one clutch into the fully engaged state; in the first gear of the torque control mode, such that the clutch commands are generated to actuate the first at least one clutch between the partially engaged state and the fully engaged state based on the engine speed according to the first schedule portion of the torque control mode schedule; and in the second gear of the torque control mode, such that the clutch commands are generated to actuate the second at least one clutch between the partially engaged state and the fully engaged state based on the engine speed according to the second schedule portion of the torque control mode schedule.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for providing power to a driven component of a work vehicle, comprising:
an engine configured to generate power;
a sensor configured to determine an engine speed associated with the engine;
a transmission comprising:
an input element configured to receive the power from the engine as input torque;
an output element configured to provide at least a portion of the power from the engine as output torque to the driven component; and
a clutch arrangement coupled to the input element and the output element to transform the input torque into the output torque, the clutch arrangement including at least one clutch selectively positionable between a fully engaged state in which approximately all of the input torque is transformed into the output torque, a partially engaged state in which a portion of the input torque is transformed into the output torque as a resultant torque fraction, and a fully disengaged state in which no input torque is transformed into the output torque; and
a controller coupled to receive data of the engine speed from the sensor, the controller further coupled to the at least one clutch and configured to generate clutch commands based at least in part on the engine speed to position the at least one clutch into the fully engaged state, the partially engaged state, or the fully disengaged state;
wherein the at least one clutch comprises a plurality of clutches, including:

a first at least one clutch configured to, upon actuation by the clutch commands, transform the input torque into the output torque at a first gear ratio as a first gear; and a second at least one clutch configured to, upon actuation by the clutch commands, transform the input torque into the output torque at a second gear ratio as a second gear;

wherein the first at least one clutch includes at least a first clutch and a second clutch; and wherein the controller is configured to generate the clutch commands to place both of the first clutch and the second clutch of the first at least one clutch into the partially engaged state when the engine speed is below a first predetermined engine speed to collectively transform the input torque into the output torque at the resultant torque fraction that is less than the input torque.

2. The power system of claim 1, wherein the transmission is a direct drive transmission.

3. The power system of claim 1, wherein the controller is configured to selectively operate in a default mode according to a default mode schedule and in a torque control mode according to a torque control mode schedule; and wherein the controller, in the first gear of the torque control mode, is configured to generate the clutch commands according to a first schedule portion of the torque control mode schedule, and in the second gear of the torque control mode, is configured to generate the clutch commands according to a second schedule portion of the torque control mode schedule associated with the second gear, the first schedule portion being different than the second schedule portion.

4. The power system of claim 3, wherein the controller, in the first gear of the default mode, is configured to generate the clutch commands to actuate both the first clutch and the second clutch of the first at least one clutch into the fully engaged state;

wherein the controller, in the second gear of the default mode, is configured to generate the clutch commands to actuate the second at least one clutch into the fully engaged state; and wherein the controller, in the second gear of the torque control mode, is configured to generate the clutch commands to actuate the second at least one clutch between the partially engaged state and the fully engaged state based on the engine speed according to the second schedule portion of the torque control mode schedule.

5. The power system of claim 4, wherein the controller, in the second gear of the torque control mode, is configured to generate the clutch commands to place the second at least one clutch into the partially engaged state when the engine speed is below a second predetermined engine speed to transform the input torque into the output torque at the resultant torque fraction that is less than the input torque.

6. The power system of claim 5, wherein the first predetermined engine speed is different than the second predetermined engine speed.

7. The power system of claim 5, wherein the controller is coupled to receive a braking request and to generate a braking command for at least one brake of the work vehicle; and wherein the controller, upon receipt of the braking request in the first gear of the torque control mode, is configured to generate the clutch commands to place the first clutch or the second clutch of the first at least one clutch into the partially engaged state such that the resultant torque fraction is a minimum resultant torque fraction.

8. The power system of claim 7, wherein the controller, upon completion of the braking request, in the first gear of the torque control mode, is configured to generate the clutch commands to place the first clutch or the second clutch of the first at least one clutch into the partially engaged state such that the resultant torque fraction is ramped up to the resultant torque fraction according to the first schedule portion of the torque control mode schedule.

9. The power system of claim 3, wherein the controller is configured to receive a mode selection from an operator mode selection element to implement the default mode or the torque control mode.

10. A transmission controller for a transmission of a work vehicle with a clutch arrangement to transform input torque from an engine into output torque to drive a drive train, the transmission controller comprising:

a processor; and memory storing one or more computer programs executable by the processor to perform transmission control operations, including:

receiving a default mode selection for implementing a default mode or a torque control mode selection for implementing a torque control mode;

receiving data of an engine speed of the engine; and generating, upon implementation of the torque control mode, clutch commands based on the engine speed for the clutch arrangement to place at least one clutch of the clutch arrangement into a fully engaged state in which approximately all of the input torque is transformed into the output torque, a partially engaged state in which a portion of the input torque is transformed into the output torque as a resultant torque fraction, or a fully disengaged state in which no input torque is transformed into the output torque;

wherein the at least one clutch comprises a plurality of clutches, including:

a first at least one clutch configured to, upon actuation by the clutch commands, transform the input torque into the output torque at a first gear ratio as a first gear; and a second at least one clutch configured to, upon actuation by the clutch commands, transform the input torque into the output torque at a second gear ratio as a second gear;

wherein the first at least one clutch includes at least a first clutch and a second clutch; and wherein the transmission controller is configured to generate the clutch commands to place both of the first clutch and the second clutch of the first at least one clutch into the partially engaged state when the engine speed is below a first predetermined engine speed to collectively transform the input torque into the output torque at the resultant torque fraction that is less than the input torque.

11. The transmission controller of claim 10, wherein the transmission control operations further include selectively operating in a default mode according to a default mode schedule and in the torque control mode according to the torque control mode schedule such that, in the first gear of the torque control mode, the clutch commands are generated according to a first schedule portion of the torque control mode schedule, and in the second gear of the torque control mode, the clutch commands are generated according to a second schedule portion of the torque control mode schedule associated with the second gear, the first schedule portion being different than the second schedule portion.

12. The transmission controller of claim 11, wherein the transmission control operations further include selectively operating,
   in the first gear of the default mode, such that the clutch commands are generated to actuate the first clutch and the second clutch of the first at least one clutch into the fully engaged state;
   in the second gear of the default mode, such that the clutch commands are generated to actuate the second at least one clutch into the fully engaged state; and
   in the second gear of the torque control mode, such that the clutch commands are generated to actuate the second at least one clutch between the partially engaged state and the fully engaged state based on the engine speed according to the second schedule portion of the torque control mode schedule.

13. The transmission controller of claim 12, wherein the transmission control operations further include selectively operating,
   in the second gear of the torque control mode, such that the clutch commands are generated to place the second at least one clutch into the partially engaged state when the engine speed is below a second predetermined engine speed and to place the second at least one clutch into the fully engaged state when the engine speed is greater than the second predetermined engine speed.

14. The transmission controller of claim 13, wherein the transmission control operations further include selectively operating,
   in the second gear of the torque control mode, such that the clutch commands are generated to place the second at least one clutch into the partially engaged state when the engine speed is below the second predetermined engine speed to transform the input torque into the output torque at the resultant torque fraction that is less than the input torque.

15. The transmission controller of claim 14, wherein the transmission control operations further include selectively operating such that the first predetermined engine speed is different than the second predetermined engine speed.

16. The transmission controller of claim 14, wherein the transmission control operations further include selectively operating to receive a braking request and to generate a braking command for at least one brake of the work vehicle, and upon receipt of the braking request in the first gear of the torque control mode, generating the clutch commands to place the first clutch or the second clutch of the first at least one clutch into the partially engaged state such that the resultant torque fraction is a minimum resultant torque fraction.

17. The transmission controller of claim 16, wherein the transmission control operations further include operating, upon completion of the braking request, in the first gear of the torque control mode, to generate the clutch commands to place the first clutch or the second clutch of the first at least one clutch into the partially engaged state such that the resultant torque fraction is ramped up to the resultant torque fraction according to the first schedule portion of the torque control mode schedule.

\* \* \* \* \*